(12) United States Patent
Sasai

(10) Patent No.: US 8,796,595 B2
(45) Date of Patent: Aug. 5, 2014

(54) ELECTROTHERMAL HEATING COOKER

(75) Inventor: Akira Sasai, Osaka (JP)

(73) Assignee: Zojirushi Corporation, Osaka (JP)

(*) Notice: Subject to any disclaimer, the term of this patent is extended or adjusted under 35 U.S.C. 154(b) by 104 days.

(21) Appl. No.: 13/455,258

(22) Filed: Apr. 25, 2012

(65) Prior Publication Data

US 2012/0325803 A1 Dec. 27, 2012

(30) Foreign Application Priority Data

Jun. 21, 2011 (JP) .................................. 2011-137468

(51) Int. Cl.
*H05B 3/06* (2006.01)
*F27D 11/00* (2006.01)

(52) U.S. Cl.
USPC ............................ 219/520; 219/385; 219/387

(58) Field of Classification Search
USPC .......... 219/520–521, 385–387, 390, 393, 402
See application file for complete search history.

(56) References Cited

U.S. PATENT DOCUMENTS

2004/0221737 A1 11/2004 Park et al.

FOREIGN PATENT DOCUMENTS

| JP | 62-5317 | * | 1/1987 |
| JP | 625317 A | | 1/1987 |
| JP | 6328444 U | | 2/1988 |
| JP | 2004-329886 | * | 11/2004 |
| JP | 2004329886 A | | 11/2004 |

* cited by examiner

*Primary Examiner* — Shawntina Fuqua
(74) *Attorney, Agent, or Firm* — The Webb Law Firm

(57) ABSTRACT

An electrothermal cooker including an upper opening, a heating case, a lid body for the upper opening, a lower heater for heating a lower portion of the heating chamber, an upper heater for heating an upper portion of the heating chamber, and a check window. The lid body includes an inner lid, beneath an outer lid, which form the upper portion of the heating chamber. The upper heater is mounted to the lid body. The outer lid and inner lid define an opening for the check window. A portion of the lower side edge of the outer lid forms an engaging portion under the check window, and an upper portion of the inner lid forms a contact support for an outer peripheral edge of the check window, engaged with the engaging portion while surrounding this outer peripheral edge portion from under.

8 Claims, 8 Drawing Sheets

United States Patent
US 8,796,595 B2

ELECTROTHERMAL HEATING COOKER

BACKGROUND OF THE INVENTION

1. Field of the Invention

The present invention relates to an electrothermal heating cooker including a casing having an upper opening and accommodating a heating case for a heating object (an object to be heated), a lid body for covering and closing the upper opening of the casing, a lower electrothermal heater for heating a lower portion inside a heating chamber formed by the casing and the lid body, an upper electrothermal heater for heating an upper portion inside the heating chamber, and a check window comprised of a plate-like transmission body allowing transmission of at least visible light therethrough.

2. Description of the Related Art

With the above-described electrothermal heating cooker, as the heating case is heated by the electrothermal heaters, the heating object accommodated in the heating case is heated and cooked. As some examples of such cooker, a bread maker, a rice cooker, a hot plate cooker, etc. can be cited.

According to a bread maker disclosed in the Japanese Unexamined Patent Application Publication No. 62-5317, as an example of such electrothermal heating cooker as above, this bread maker includes a baking chamber case 30 having an upper opening and accommodating a bread baking pan 32 for heating bread dough, a lid body 40 for closing the upper opening of the baking chamber case 30, a lower heater 27 for heating a lower portion inside a baking chamber 50 formed by the bread baking chamber case 30 and the lid body 40, and an upper heater 42 for heating an upper portion inside the baking chamber 50. With this bread maker disclosed in the Japanese Unexamined Patent Application Publication No. 62-5317, it is said that as the baking chamber 50 is heated from all sides thereof by the upper heater 42 and the lower heater 27, there is achieved uniform heating of the bread dough placed inside the bread pan 32, so that bread having less baking unevenness can be baked. In the above, the names and the reference numerals of the above components are those employed in the Japanese Unexamined Patent Application Publication No. 62-5317.

On the other hand, in the case of a bread maker disclosed in the Japanese Unexamined Patent Application Publication No. 2004-329886 or Japanese Unexamined Utility Model Application Publication No. 63-28444, there is disclosed an arrangement wherein the bread maker is provided with a check window for allowing checking of the inside condition of the bread maker.

More particularly, the bread maker disclosed in the Japanese Unexamined Patent Application Publication No. 2004-329886 includes a main body 20 having a front opening and accommodating a tray 39 for heating bread dough, a door 40 for closing the front opening of the main body 20, an upper heater 50a for heating an upper portion of an oven 30 formed by the main body 20 and the door 40, a lower heater 50b for heating a lower portion of the oven 30, and a window glass 42 for allowing checking of the inside condition of the main body 20 from the outside. In the above, the names and the reference numerals of the above components are those employed in the Japanese Unexamined Patent Application Publication No. 2004-329886.

Further, the bread maker disclosed in the Japanese Unexamined Utility Model Application Publication No. 63-28444 includes a main body 1 having an upper opening and accommodating a bread vessel 6 for heating bread dough, a lid 2 for closing the upper opening of the main body 1, a heater 13 for heating an upper portion inside an inner case 4 formed by the main body 1 and the lid 2, a heater 13 for heating a lower portion inside the inner case 4, and a peep window 14 formed of heat-resistant glass for allowing visual checking of the bread dough placed inside the bread vessel 6 from the outside. In the above, the names and the reference numerals of the above components are those employed in the Japanese Unexamined Utility Model Application Publication No. 63-28444.

As described above, some of the conventional electrothermal heating cookers are provided with a check window for allowing checking of the cooked condition of the heating object inside the casing from the outside. However, since the inside of the casing is sealed and closed by means of a lid body or the like, steam generated from the heating object sometimes adheres to the check window and condensates thereon to cloud this check window. In such case, sometimes visual inspection of the cooked condition of the heating object inside the casing through the check window from the outside is not possible.

On the other hand, as described above, with the conventional electrothermal heating cookers, there is disclosed the arrangement that the cooker is equipped with not only a lower electrothermal heater, but also an upper electrothermal heater. However, the upper electrothermal heater is provided only for the sake of adjustment of baked condition of the upper portion of the heating object, without giving consideration to the disposing relationship relative to the check window. Therefore, even if the upper portion of the heating object is heated by such upper electrothermal heater, the above-described problem of clouding of the check window has remained unsolved.

SUMMARY OF THE INVENTION

The present invention has been made in view of the above-described state of the art and its object is to provide an electrothermal heating cooker which allows reliable heating of an upper portion of a heating object and to prevent clouding of the check window through a simple arrangement, through appropriate layout of the upper electrothermal heater and the check window.

For accomplishing the above-noted object, an electrothermal heating cooker relating to the present invention, comprises:

a casing having an upper opening and accommodating a heating case for a heating object;

a lid body for covering and closing the upper opening of the casing;

a lower electrothermal heater for heating a lower portion inside a heating chamber formed by the casing and the lid body;

an upper electrothermal heater for heating an upper portion inside the heating chamber; and a check window comprised of a plate-like transmission body allowing transmission of at least visible light therethrough;

wherein said lid body includes an outer lid and an inner lid made of metal, the inner lid being disposed downwardly of the outer lid and partitioning and forming the upper portion inside the heating chamber;

said upper electrothermal heater is mounted to said lid body adjacent said inner lid;

said outer lid and said inner lid respectively define an opening corresponding to said check window; and wherein a lower side of an opening edge portion of said outer lid forms an engaging portion for engaging from under said plate-like transmission body constituting said check window, and an upper side of an opening edge portion of said inner lid forms a contact supporting portion for contacting and supporting an outer peripheral edge portion of said plate-like transmission body engaged with said engaging portion while surrounding this outer peripheral edge portion from under.

With the above-described characterizing feature, basically, heat from the upper electrothermal heater is transferred directly or indirectly via the inner lid formed of metal to the upper portion of the heating object inside the heating case. Therefore, the upper portion of the heating object can be heated sufficiently and it is also possible to give a satisfactory toasting color to the surface of the upper portion of the heating object.

Further, in the fixing arrangement for fixing the plate-like transmission body to the lid body, this can be made by engaging the plate-like transmission body from under with the engaging portion formed on the lower side of the opening edge portion of the outer lid and then causing the outer peripheral edge portion of this engaged plate-like transmission body to be contacted and supported from the under with and by the contact supporting portion provided on the upper side of the opening edge portion of the inner lid. Hence, the arrangement can be very simple. Further, as the plate-like transmission body is fixed as being clamped between the engaging portion of the outer lid and the contact supporting portion of the inner lid and the outer peripheral edge portion of this plate-like transmission body is contacted and supported, along at least a part of or substantially entire perimeter thereof, with and by this contact supporting portion with being surrounded from under along the substantially entire perimeter thereof by this contact supporting portion, there is realized reliable fixation of the plate-like transmission body.

Further, as the outer peripheral edge portion of the plate-like transmission body engaged with the engaging portion is contacted and supported from under by the contact supporting portion formed on the upper side of the opening edge portion of the metal inner lid while being surrounded thereby from under, heat of the upper electrothermal heater can be transferred effectively for its heating to air present downwardly of the plate-like transmission body inside the heating chamber via the inner lid which partitions and forms the upper portion inside the heating chamber, in particular the substantially entire perimeter of the contact supporting portion of the inner lid. In addition, as the heat of the upper electrothermal heater is transferred directly to the substantially entire perimeter or at least a part of the outer peripheral edge portion of the plate-like transmission body through the substantially entire perimeter or at least a portion of the perimeter of the contact supporting portion of the inner lid which contacts and supports the plate-like transmission body, this plate-like transmission body per se can be heated well. Therefore, while the inner lid having the function of fixing the plate-like transmission body is effectively utilized, heating of the air present downwardly of the plate-like transmission body inside the heating chamber and heating of this plate-like transmission body per se can be effected at one time, so that with the heat transferred from the upper electrothermal heater, the temperature of the air and the temperature of the plate-like transmission body can be raised easily. For this reason, even if steam is generated from the heating object or the like inside the heating chamber, it is possible to reliably prevent clouding of the plate-like transmission body constituting the check window due to dew condensation.

Hence, it has become possible to reliably heat the upper portion of the heating object and to prevent clouding of the check window through a simple arrangement, through appropriate layout of the upper electrothermal heater and the check window.

According to a further characterizing feature of the electrothermal heating cooker relating to the present invention, said upper electrothermal heater has a bent or curved shape and is disposed in such a manner to surround said plate-like transmission body as seen in a plane view.

With the above-described characterizing feature, since the upper electrothermal heater disposed in the vicinity of the inner lid formed of metal has a bent or curved shape and disposed in such a manner to surround the plate-like transmission body as seen in a plane view, heat from the upper electrothermal heater is transferred easily and reliably to the contact supporting portion of the inner lid surrounding the plate-like transmission body along the substantially entire perimeter thereof and also the heat is transferred easily and reliably via this contact supporting portion to the outer peripheral edge portion of the plate-like transmission body along at least a portion of or substantially entire perimeter thereof. Therefore, with the heat from the upper electrothermal heater, the temperature of the air present downwardly of the plate-like transmission body and the temperature of the plate-like transmission body per se can be raised with less unevenness along and over the substantially entire perimeter of the plate-like transmission body, so that clouding due to dew condensation can be prevented even more reliably.

Hence, it has become possible to reliably heat the upper portion of the heating object and to prevent clouding of the check window through a simple arrangement even more effectively, through even more appropriate layout of the upper electrothermal heater and the check window.

According to a still further characterizing feature of the electrothermal heating cooker relating to the present invention, said inner lid includes a top face portion which partitions and forms a top face inside the heating chamber and a lateral face portion which partitions and forms a lateral face inside the heating chamber, and said top face portion includes a bulging portion which bulges upward and an upper end portion of said bulging portion as an upper side of the opening edge portion of the inner lid constitutes said contact supporting portion.

With the above-described characterizing feature, since the inner lid which partitions and forms the upper portion of the inside of the heating chamber includes a top face portion which partitions and forms a top face inside the heating chamber and a lateral face portion which partitions and forms a lateral face inside the heating chamber, it is possible to provide the inner lid with a simple construction while securing as large as possible the space in the upper portion of the inside of the heating chamber and also to realize cost reduction In addition, since the top face portion of the inner lid includes a bulging portion which bulges upward and an upper end portion of the bulging portion constitutes the contact supporting portion (the upper side of the opening edge portion of the inner lid) which contacts and supports the outer peripheral edge portion of the plate-like transmission body engaged with the engaging portion while surrounding it from under. Therefore, when the air which has been heated to a relatively high temperature as being heated by the lower electrothermal heater or the upper electrothermal heater rises, in the upper portion inside the heating chamber, this air is guided along the lateral face portion and the top face portion of the inner lid to the space inside the bulging portion formed in this top face portion. Hence, with this air guided to this space and having the relatively high temperature, it is possible to even more reliably raise the temperature of the air present downwardly of the plate-like transmission body constituting the check window and the temperature of the plate-like transmission body per se, whereby the clouding due to dew condensation can be prevented even more reliably. Furthermore, since the upper end portion of the bulging portion constitutes the contact supporting portion which contacts and supports the outer peripheral edge portion of the plate-like transmission body, with this air guided to this space and having the relatively high temperature, the contact supporting portion is heated and via this contact supporting portion, the outer peripheral edge portion of the plate-like transmission body can be heated even further.

According to a further characterizing feature of the electrothermal heating cooker relating to the present invention, a heater cover made of metal is disposed in opposition to and downwardly of a heat shield plate as said inner lid, and said upper electrothermal heater is disposed in a space formed between said heat shield plate and said heater cover and in contact with said heater cover.

With the above-described characterizing feature, the heat transferred downwardly from the upper electrothermal heater is transferred via mainly the metal heater cover placed in contact with the upper electrothermal heater to the upper portion of the heating object located downwardly. On the other hand, the heat transferred upwardly from the upper electrothermal heater is shielded mainly by the heat shield plate (inner lid) and reflected toward the heater cover side (the downward side) disposed in opposition to and downwardly of the heat shield plate, so that this heat is transferred through this heater cover to the upper portion of the heating object disposed downwardly. Therefore, the heat from the upper electrothermal heater can be transferred even more efficiently to the upper portion of the heating object, whereby electric power consumption can be reduced.

According to a still further characterizing feature of the electrothermal heating cooker relating to the present invention, said heater cover has a thermal conductivity which is set equal to or higher than the thermal conductivity of said heat shield plate.

With the above-described characterizing feature, since the heater cover has a thermal conductivity which is set equal to or higher than the thermal conductivity of said heat shield plate, it is possible to increase the amount of heat transferred from the upper electrothermal heater to the heater cover, whereby the heating object can be heated more efficiently and the amount of heat transfer to the side of the heat shield plate can be reduced, thereby to prevent deterioration and/or deformation of resin or the like which forms the outer lid of the lid.

According to a still further characterizing feature of the electrothermal heating cooker relating to the present invention, the electrothermal heating cooker further comprises a control section for controlling operation of said upper electrothermal heater; and wherein said control section causes said upper electrothermal heater to generate heat in at least one of a kneading process and a fermenting process for bread dough which process is effected prior to a baking process for baking bread dough as said heating object placed inside said heating case.

With the above-described characterizing feature, even if steam is generated from the bread dough as the heating object during the kneading process or the fermenting process wherein the inside of the heating chamber is a relatively low temperature, the control section provides power to the upper electrothermal heater for generating heat. Hence, as described above, with the heat transfer from the upper electrothermal heater, the heating of the air present downwardly of the plate-like transmission body and heating of the plate-like transmission body per se are effected simultaneously, so that the temperature of this air and the temperature of the plate-like transmission body can be raised reliably and easily. Therefore, in case the bread is baked by effecting the kneading process, the fermenting process and the baking process, even during the kneading process or the fermenting process when the inside of the heating chamber has a relatively low temperature and there is the tendency of occurrence of dew condensation on the plate-like transmission body constituting the check window, clouding due to dew condensation can be prevented even more reliably.

According to a still further characterizing feature of the electrothermal heating cooker relating to the present invention, the electrothermal heating cooker further comprises a control section for controlling the operation of the upper electrothermal heater, said control section causing said upper electrothermal heater to generate heat during a baking process for baking bread dough as the heating object inside the heating case.

With the above-described characterizing feature, as the control section causes the upper electrothermal heater to generate heat during a baking process, the upper portion of the bread dough can be heated with the heat transferred from the upper electrothermal heater, so that toasting color can be applied thereto in a reliable manner. Incidentally, during a baking process when the temperature of the inside of the heating chamber becomes relatively high, clouding of the plate-like transmission body constituting the check window rarely occurs. However, in such case too, by causing the upper electrothermal heater to generate heat, the clouding of the plate-like transmission body can be prevented even more reliably.

DESCRIPTION OF THE PREFERRED EMBODIMENTS

Next, with reference to the accompanying drawings, there will be described embodiments in which the present invention is applied to a bread maker as an example of an electrothermal heating cooker.

Figure 1:
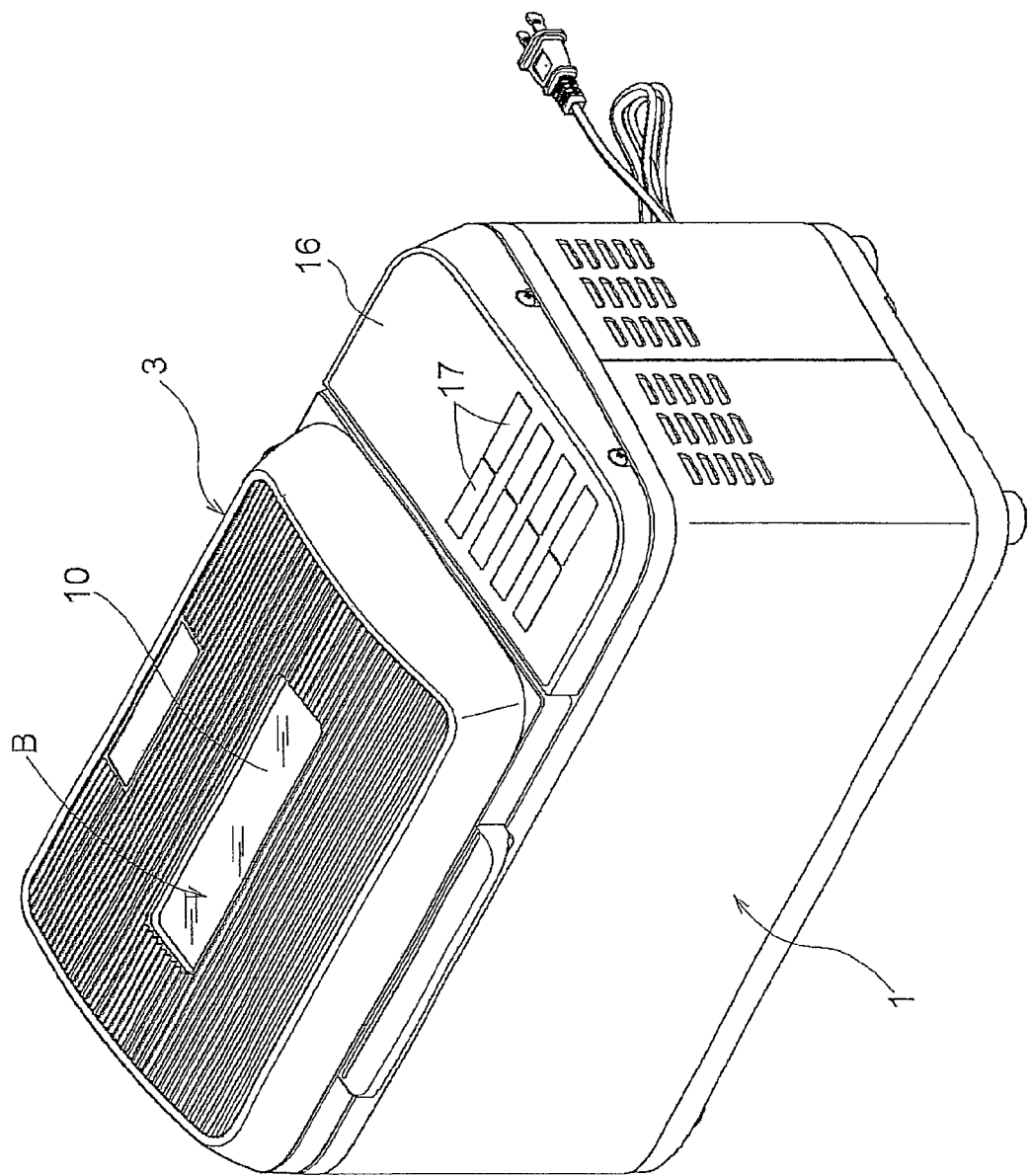
FIG. 1 is a perspective view showing an outer appearance of a bread maker.
Figure 2:
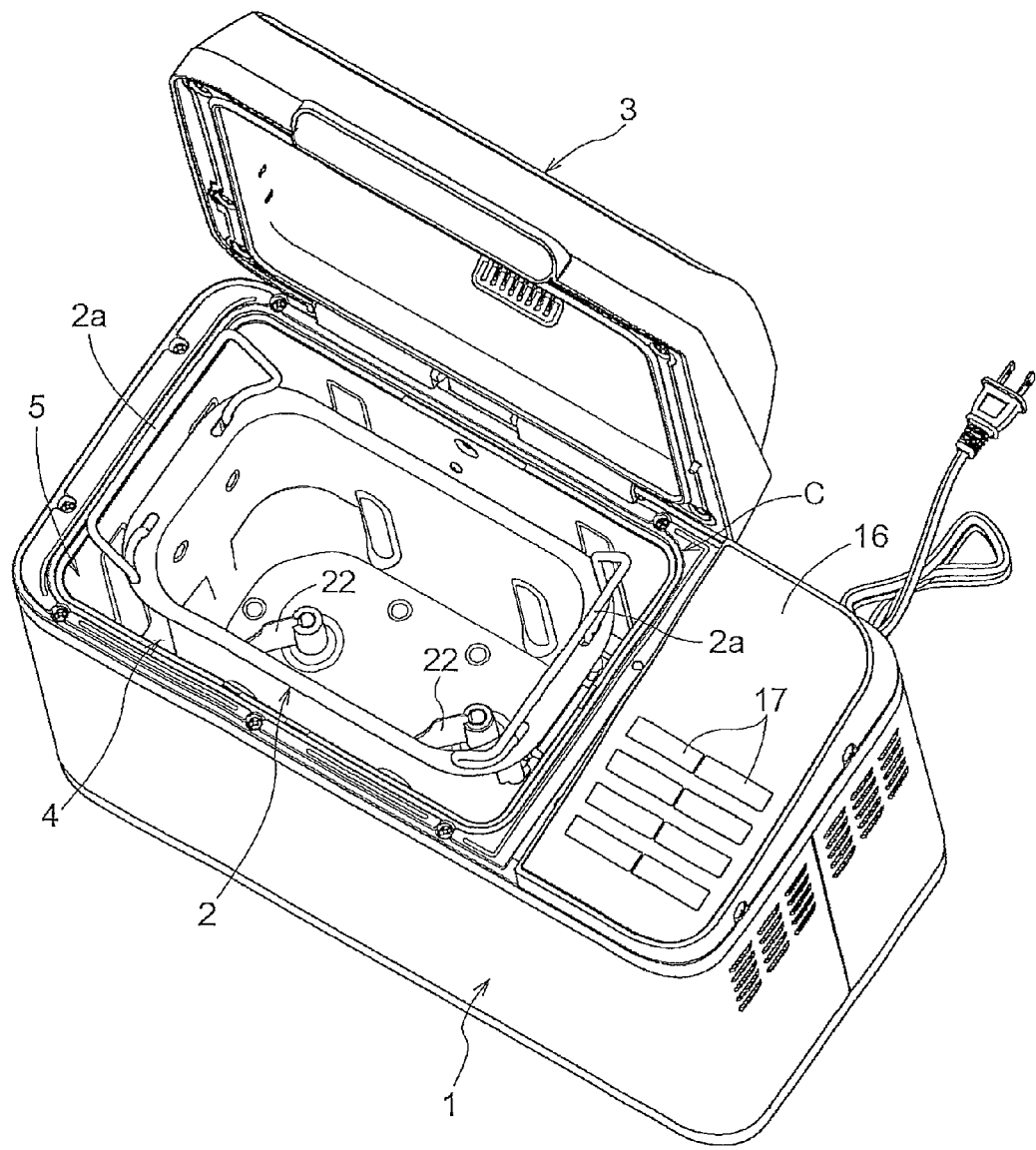
FIG. 2 is a perspective view showing the outer appearance of the bread maker with its lid body being opened.

As shown in FIG. 1 and FIG. 2, a bread maker includes a main body 1 having an upwardly open casing C (an example of "casing") therein, a bread case 2 (an example of "heating case") mounted inside the casing C to be attachable/detachable thereto/from, a lid body 3 capable of opening/closing the upper opening 4 of the casing C, and a check window B comprised of a heat-resistant glass plate 10 (an example of "plate-like transmission body) which allows transmission of at least visible light therethrough.

Figure 3:
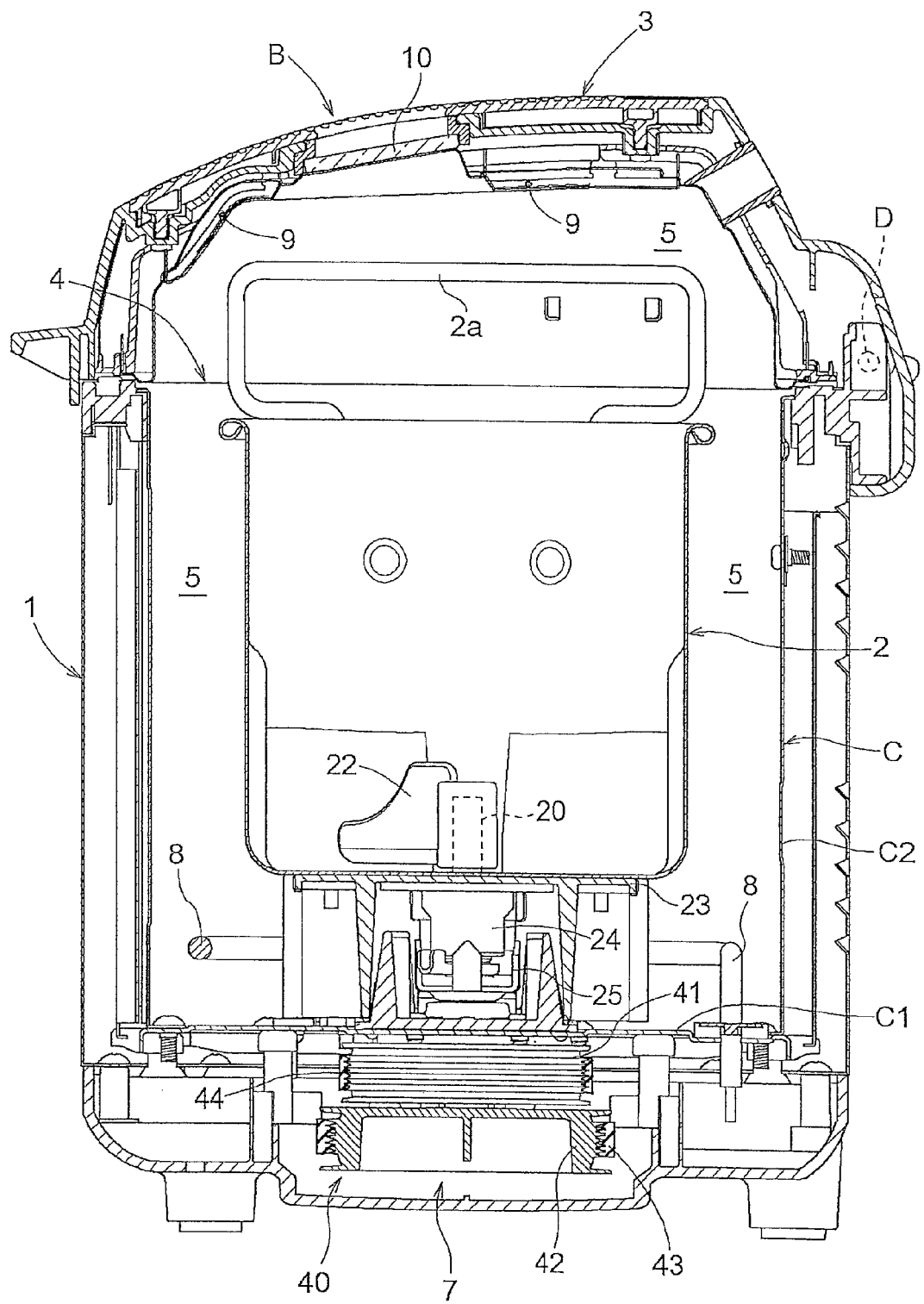
FIG. 3 is a side view in vertical section showing the bread maker.
Figure 4:
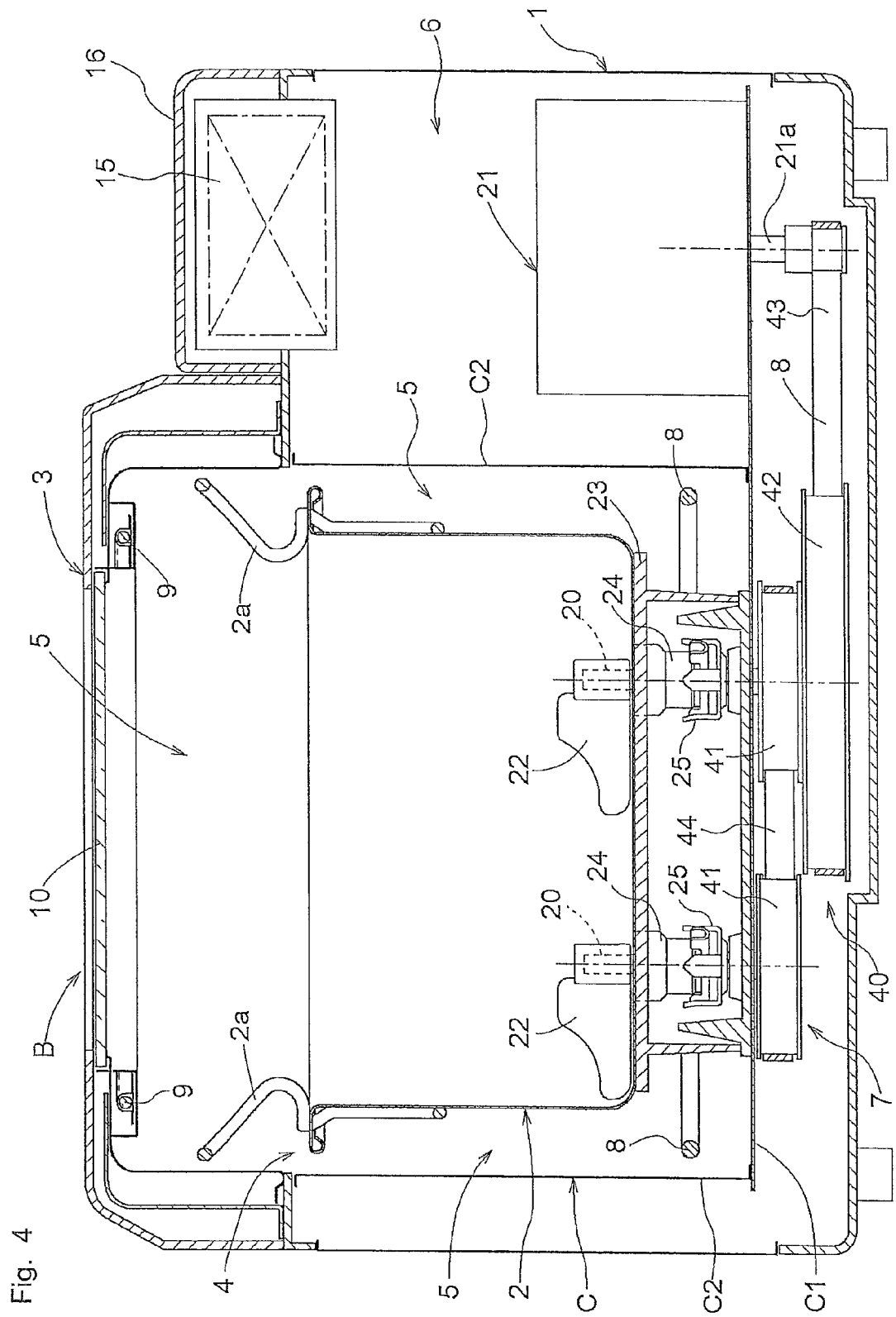
FIG. 4 is a front view in vertical section showing the bread maker.

As shown in FIG. 3 and FIG. 4, the main body 1 is formed as a bottomed box member having an approximately rectangular shape in the plane view and having an opening in the upper portion thereof. The inside of the main body 1 is partitioned into three sections, i.e. a heating chamber 5 formed inside the casing C on the one end side of the longitudinal direction as seen in the plane view, a control section accommodating chamber 6 formed on the other end side of the longitudinal direction, and a transmission section accommodating chamber 7 formed downwardly of the heating chamber 5 and the control section accommodating chamber 6.

More particularly, in the main body 1 along substantially entire area inside thereof, there is disposed a bottom plate member C1 in the form of a rectangular plate as seen in the plane view. The bottom plate member C1 is disposed with a space provided by a spacer (not shown) so as to form the transmission section accommodating chamber 7 with the bottom of the main body 1 (see FIG. 3 and FIG. 4). Further, in the main body 1, a peripheral wall member C2 fixed on the bottom plate member C1 with an offset toward one side (the left side in FIG. 4) of the longitudinal direction of the main body 1, the peripheral wall member C2 having an approximately rectangular cylindrical shape having rounded four corners as seen in the plane view. This peripheral wall member C2 is disposed in such a manner as to form, inside the space upwardly of the bottom plate member C1, a portion of the heating chamber 5 at one side end in the longitudinal direction of the main body 1 and to form the control section accommodating chamber 6 at the other end side (the right side in FIG. 4). The bottom plate member C1 on the one end side in the longitudinal direction of the main body 1 forms the bottom of the casing C and the peripheral wall member C2 forms the lateral peripheral face of the casing C, and the casing C is formed like a bottomed box having the upper opening 4. Therefore, as will be detailed later, the inner space formed and partitioned by the bottomed box-like casing C and the approximately inverse-U shaped lid body 3 bulging upward as seen in the side view in vertical section and the front view in vertical section is formed as the heating chamber 5. And, the bread case 2 is accommodated inside this heating chamber 5.

As shown in FIG. 3 and FIG. 4, the bread maker includes a lower electrothermal heater 8 and an upper electrothermal heater 9 whose operations are controlled by a control section 15 to be described later. These lower electrothermal heater 8 and upper electrothermal heater 9 can be comprised of so-called sheath heaters, for instance.

The lower electrothermal heater 8 is formed as an elongate member which is bent to extend around over the bottom face of the casing C and this heater 8 is disposed at a position spaced from the bottom face via a heater support member (not shown). This lower electrothermal heater 8 is disposed at a lower portion inside the heating chamber 5 so that the heater 8 is capable of heating mainly this lower portion inside the heating chamber 5, and the lower and lateral portion of the bread case 2.

Further, as will be detailed later, the upper electrothermal heater 9 is mounted to the lid body 3 so that this heater 9 is capable of heating mainly the upper portion inside the heating chamber 5 and the upper portion of the bread case 2.

As shown in FIGS. 2 through 4, the bread case 2 is formed like a bottomed box which has a rectangular shape with rounded four corners as viewed in the plane view and has an upper opening. At the edge portion of this upper opening, there are provided a pair of handles 2a, 2a distributed on the opposed sides in the longitudinal direction of the bread case 2.

As shown in FIG. 4, to the back face side of the bottom of the bread case 2, there is integrally attached a bread case table 23 for mounting and supporting the bread case 2 thereon.

Also, at the bottom of the bread case 2, a pair of drive shafts 20, 20 are juxtaposed along the longitudinal direction as being supported to be rotatable about vertical axes. And, to a projecting portion of each drive shaft 20 projecting from the bottom of the bread case 2, a driven side coupling member 24 is fixed. On each drive shaft 20, a blade member 22 is detachably attached.

And, as shown in FIGS. 2 through 4, the bread case 2 is mounted inside the casing C (inside the heating chamber 5) as being mounted and supported on the bread case table 23.

Further, an arrangement is provided such that when the bread case 2 is mounted inside the casing C, the upper opening of the bread case 2 is positioned lower than the upper opening 4 of the casing C. With this arrangement, even when the lid body 3 is opened, discharge of heat from the inside of the bread case 2 is restricted, thus restricting temperature drop inside the bread case 2.

As shown in FIGS. 2 through 4, at the bottom of the casing C, a pair of driving side coupling members 25, 25 are supported to be rotatable about vertical axes and juxtaposed along the longitudinal direction of the heating chamber 5 so as to come into engagement with the driven side coupling members 24, 24 respectively, when the bread case 2 as being attached to the bread case table 23 is mounted inside the casing C.

As shown in FIG. 4, the control section accommodating chamber 6 accommodates an electric motor 21 for rotatably driving the pair of drive shafts 20, and the control section 15 for controlling the operation of the bread maker by controlling the operations of the lower electrothermal heater 8, the upper electrothermal heater 9, the electric motor 21, etc. Though not shown, the control section 15 is constituted of a CPU, a memory etc. as known information processing means and is configured to be capable of providing electric power supplied from a power source to the respective components appropriately. Further, as shown in FIG. 1, FIG. 2 and FIG. 4, a cover 16 for closing the top of this control section accommodating chamber 6 includes an operational section 17 having operation switches, etc.

Further, as shown in FIG. 3 and FIG. 4, the transmission section accommodating chamber 7 accommodates a transmission section 40 which operably couples the electric motor 21 with the pair of drive shafts 20, 20 for power transmission.

The transmission section 40 includes a pair of small pulleys 41, 41 fixed respectively to the rotational shaft portions (not shown) of the pair of driving side coupling members 25, 25 projecting respectively downward from the bottom plate member C1, a large pulley 42 fixed to the downwardly projecting rotational shaft portion (not shown) of one small pulley 41, a first timing belt 43 entrained around an output shaft 21a of the electric motor 21 and the large pulley 42, and a second timing belt 44 entrained around the pair of small pulleys 41, 41. With this, the pair of drive shafts 20, 20 are rotatably driven by the electric motor 21.

As shown in FIG. 2 and FIG. 3, the lid body 3 is attached via a hinge arrangement to the rear edge portion (the right side in FIG. 3) of the upper opening 4 of the casing C to be pivotable about an axis D extending along the longitudinal direction of the casing C. With this pivotal operation, the lid body 3 can open/close the upper opening 4 of the casing C. Incidentally, details of the construction of this lid body 3 will be explained later herein.

With the bread maker having the above-described construction in operation, an amount of bread making material (bread dough, not shown) will be charged into the bread case 2 and a start of operation is commanded from the operational section 17. With this, the control section 15 controls operations of the lower electrothermal heater 8, the upper electrothermal heater 9, the electric motor 21, etc, thereby to effect a kneading process for kneading the bread dough, a fermenting process for fermenting the bread dough, and a baking process for heating and baking the bread dough, one after another, whereby a bread is baked.

Incidentally, the kneading process, the fermenting process and the baking process are known. Therefore, explanation of the operational conditions of these respective processes will be omitted herein. However, it is noted that the temperature inside the heating chamber 5 is set to about 40° C. in the kneading process and the fermenting process and to about 160 to 170° C. in the baking process.

Next, the characterizing arrangement of the present invention will be described.

As described hereinbefore, the lid body 3 of the bread maker relating to the present invention is configured to pivot about the axis D to be capable of opening/closing the upper opening 4 of the casing C.

Figure 5:
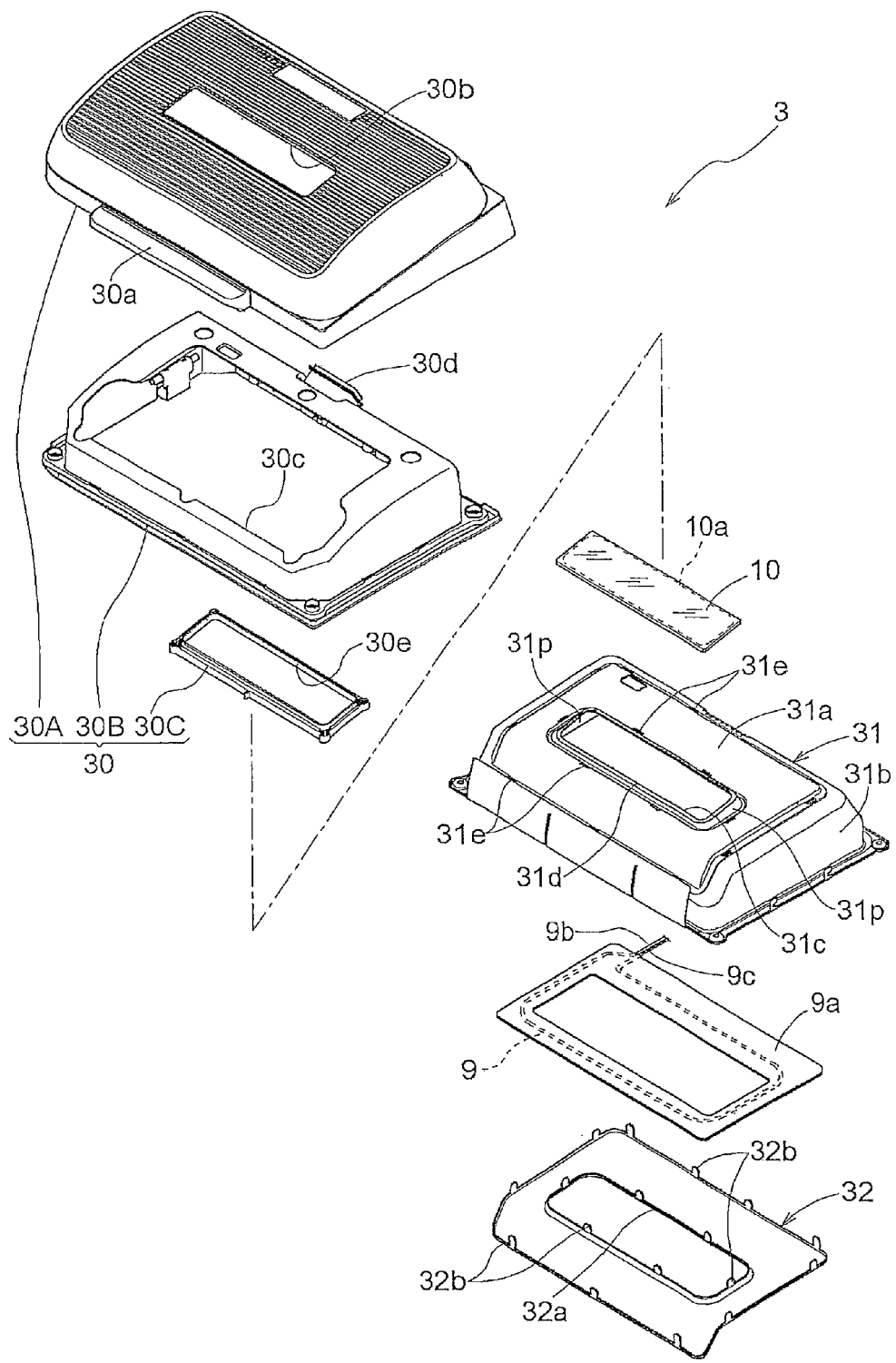
FIG. 5 is an exploded perspective view of the lid body.

As shown in FIGS. 3 through 7, and in FIG. 5 in particular, the lid body 3 includes an outer lid 30 disposed at the top portion, a heat shield plate 31 as an inner lid disposed downwardly thereof, a check window B comprised of a heat resistant glass plate 10 which allows transmission of at least visible light for allowing visual check of the inside of the heat chamber 5, the upper electrothermal heater 9 for heating the upper portion of the heating chamber 5 and a heater cover 32 for transferring heat from the upper electrothermal heater 9 to the lower side uniformly.

Figure 6:
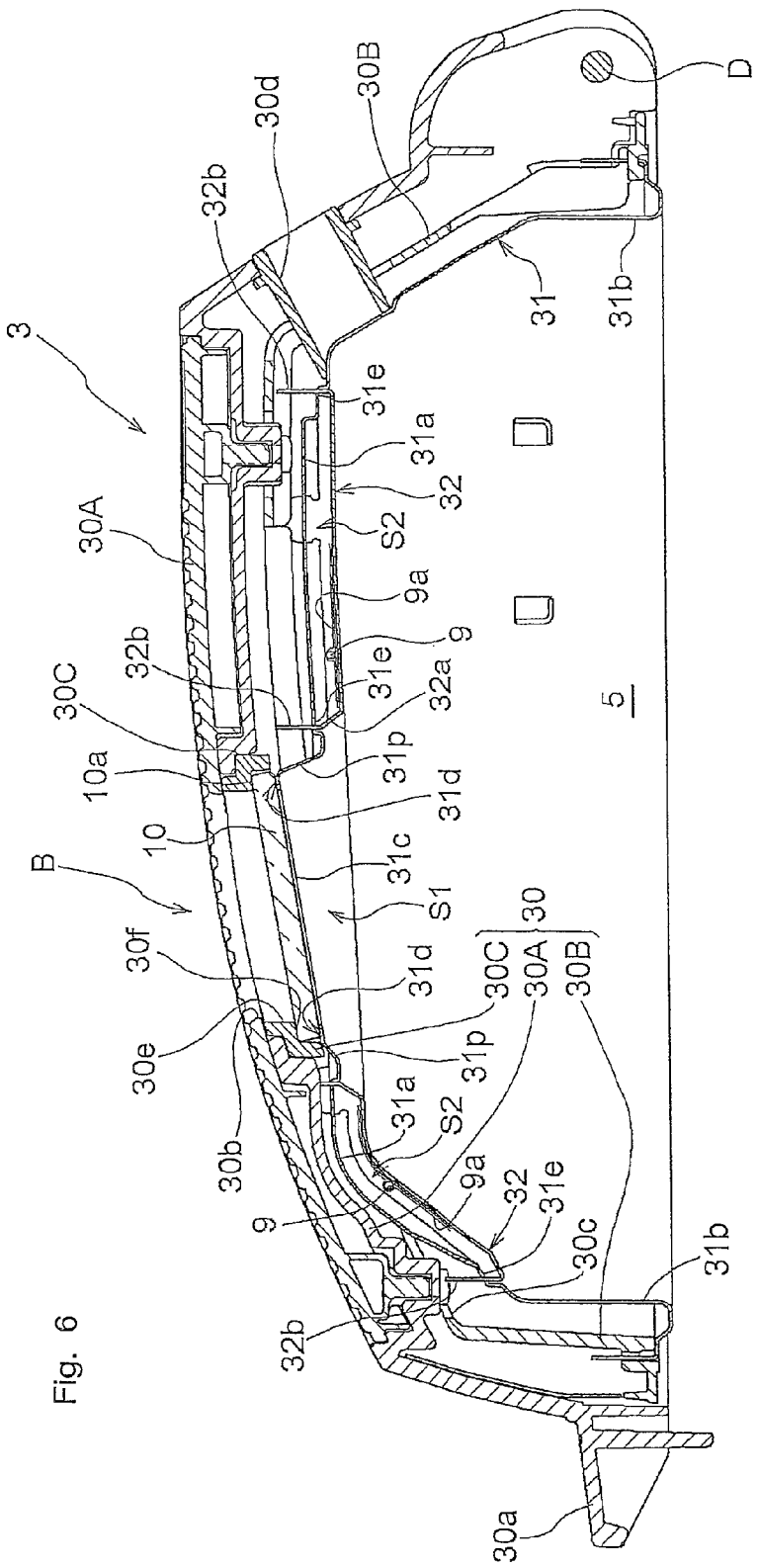
FIG. 6 is a side view in vertical section showing the lid body.

As shown in FIG. 5 and FIG. 6, the outer lid 30 is formed of heat resistant resin and includes an outer cover 30A positioned uppermost, and an inner cover 30B and a frame member 30C which are disposed downwardly of the outer cover 30A. Meanwhile, the outer lid 30 is formed to extend with slightly downward inclination from the rear side to the front side thereof (from the right side to the left side in FIG. 6) as viewed in the vertically sectional side view.

Figure 7:
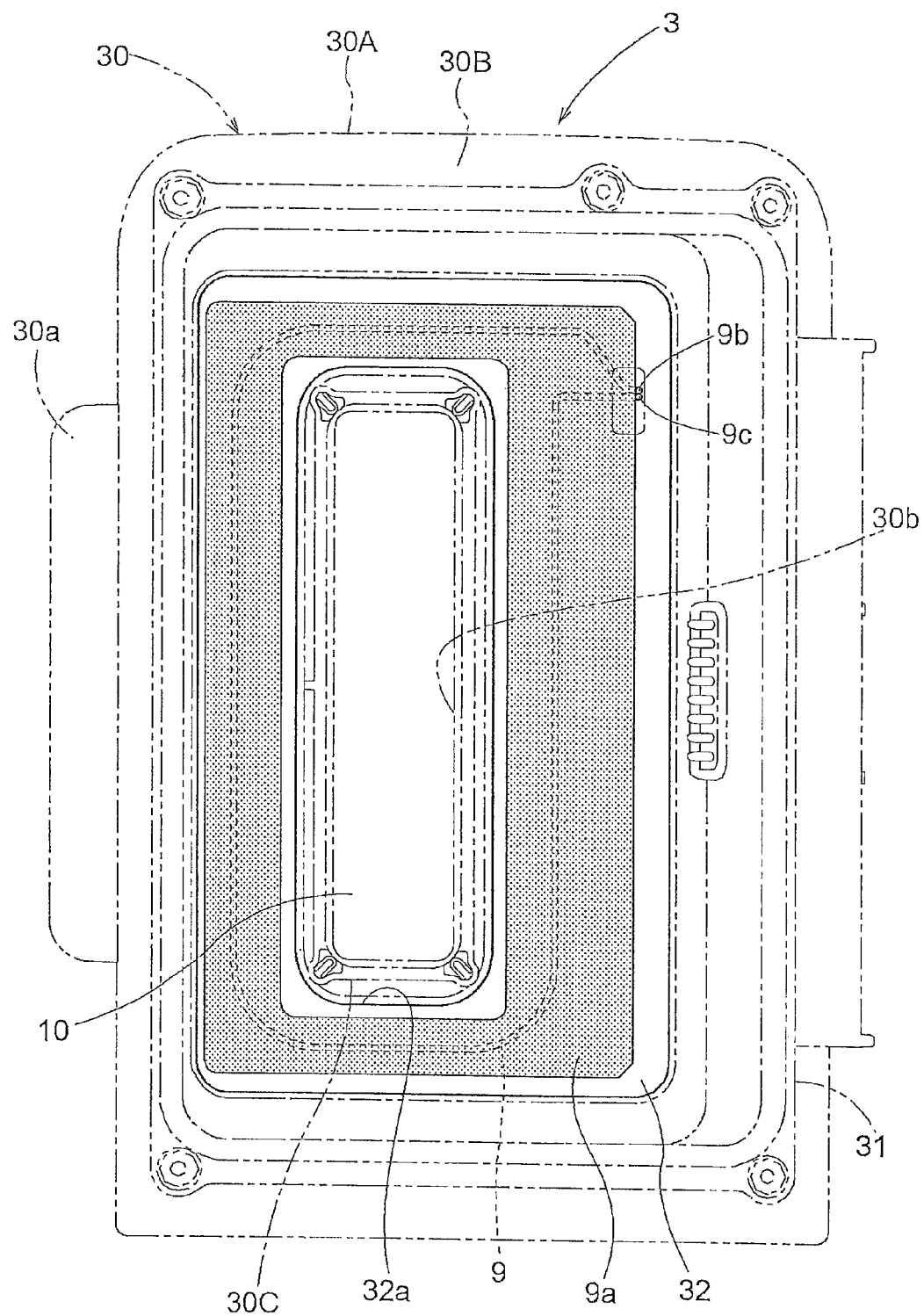
FIG. 7 is a bottom view of the lid body.

As shown in FIG. 5 and FIG. 6, the outer cover 30A has a rectangular shape similar to the peripheral wall member C2 which is formed rectangular in the plane view and bulges upward in the vertically sectional side view and vertically sectional front view, thus presenting an approximately inverse-U shape. On the front side (the left side in FIG. 6) of the outer cover 30A, there is provided a flange portion 30a which engages the outer cover 30A and can be opened/closed. Further, as shown in FIG. 7, the outer cover 30A forms a rectangular opening 30b corresponding to the shape of the heat resistant glass plate 10 of the check window B, with the longitudinal direction of the opening 30b being aligned with the longitudinal direction of the outer cover 30A. This opening 30b is formed at the substantial center in the right/left direction (the vertical direction in FIG. 7) of the outer cover 30A and at a position offset slightly forwardly from the center in the front/rear direction (right/left direction in FIG. 7).

As shown in FIG. 5 and FIG. 6, the inner cover 30B is formed as a frame-like member which is rectangular like the outer cover 30A in the plane view and has an approximately inverse-U shape bulging upward in the vertically sectional side view and vertically sectional front view, just like the outer cover 30A. The inner cover 30B forms a rectangular opening 30c which is larger than the opening 30b of the outer cover 30A. Incidentally, as shown in FIG. 5 and FIG. 7, on the rear side (the right side in FIG. 6) of the outer cover 30A and the inner cover 30B, there is formed a vapor vent 30d therethrough for allowing discharging of steam present inside the heating chamber 5.

As shown in FIG. 5 and FIG. 6, the frame member 30C is formed as a rectangular frame-like member as viewed in the plane view and has a rectangular opening 30c which is sized similarly to the rectangular opening 30b of the outer cover 30A. Incidentally, the frame member 30C has a substantially similar and slightly larger shape to/than the heat resistant glass plate 10 (having a rectangular shape) of the check window B to be described later. Further, in the frame member 30C, at the lower side of the opening edge portion of the opening 30e, a stepped portion is formed to extend along the entire perimeter of the opening portion 30e, the stepped portion having a downwardly enlarged diameter. This stepped portion has a rectangular shape which is larger than the opening 30e and is formed to have an approximately same size as the rectangular heat resistance glass plate 10 to be described later. Therefore, as the upper face of the heat resistant glass plate 10 is placed in contact with the lower face of this stepped portion, this heat resistant glass plate 10 can be engaged from under. Hence, this stepped portion of the frame member 30C constitutes an engaging portion 30f (an example of the lower side of the opening edge portion of the outer lid 30) to which the heat resistant glass plate 10 is caused to engage from under.

As shown in FIG. 5 and FIG. 6, the heat shield plate 31 is formed of metal and has a rectangular shape in the plane view, just like the outer cover 30A and the inner cover 30B of the outer lid 30 and has an approximately inverse U-shape bulging upward like the outer cover 30A as seen in the vertically sectional side view and vertically sectional front view. The heat shield plate 31 is disposed upward in opposition to the upper opening 4 of the casing C (see FIG. 3) and partitions and forms the upper portion inside the heating chamber 5. More particularly, the heat shield plate 31 bulges upward so as to partition and form, at the upper portion inside the heat chamber 5, a top face portion 31a partitioning/forming the top face inside the heating chamber 5, and lateral face portions 31b partitioning/forming the lateral faces inside the heating chamber 5. Incidentally, the lower portion and the lateral portions inside the heating chamber 5 are partitioned/formed by the casing C.

The top face portion 31a of the heat shield plate 31 defines a rectangular opening 31c having a shape corresponding to the shape of the heat resistant glass plate 10 of the check window B, with the longitudinal direction thereof being aligned with the longitudinal direction of the heat shield plate 31. This opening 31c is formed at the substantial center position in the right/left direction (the vertical direction in FIG. 7) of the top face portion 31a and at a position slightly offset to the forward side from the center position in the front/rear direction (the right/left direction in FIG. 7). Further, this opening 31c has a rectangular shape of the substantially same size as the opening 30b of the outer cover 30A and the opening 30e of the frame member 30C, but of a size slightly smaller than the heat resistant glass plate 10. At the opening edge portion of this opening 31c, there is formed a bulging portion 31p which extends along the entire perimeter of the opening 30c and bulges upward from the top face portion 31a. Therefore, at the upper end portion of this bulging portion 31p, the opening 31c is formed and the upper end portion of this bulging portion 31p constitutes a contact supporting portion 31d (an example of the upper side of the opening edge portion of the inner lid) which contacts and supports the outer peripheral edge portion 10a of the heat resistant glass plate 10 engaged with the engaging portion 30f of the frame member 30C as surrounding it from under the entire perimeter thereof. Further, the bulging portion 31p formed in the top face portion 31a forms a space S1 which bulges upward inside the bulging portion 31p (see FIG. 6).

As shown in FIGS. 5 through 7, the heat resistant glass plate 10 constituting the check window B is formed as a rectangular and transparent plate. More particularly, the heat resistant glass plate 10 has a rectangular shape of a size that allows engagement from under the engaging portion 30f as the stepped portion of the frame member 30C and that allows also contacting/supporting from under the contact supporting portion 31d of the heat shield plate 31. And, when the heat resistant glass plate 10 is engaged with the engaging portion 30f and contacted and supported by the contact supporting portion 31d, the heat resistant glass plate 10 is disposed substantially parallel with the surface of the outer cover 30A.

As shown in FIGS. 5 through 7, the heater cover 32 is formed of metal and has a rectangular shape in the plane view like the top face portion 31a of the heat shield plate 31 and formed along the lower face of the top face portion 31a as seen in the vertically sectional side view and vertically sectional front view. The heater cover 32 forms a rectangular opening 32a having a size which is slightly larger than the heat resistant glass plate 10 of the check window B and the bulging portion 31p of the heat shield plate 31, with the longitudinal direction of the opening 32a being aligned with the longitudinal direction of the heater cover 32. This opening 32a is formed at the substantially center position in the right/left direction (the vertical direction in FIG. 7) of the heater cover 32 and at a position slightly offset forwardly from the center position in the front/rear direction (the right/left direction in FIG. 7). Along the outermost peripheral edge portion of the heater cover 32 and the opening edge portion of the opening 32a, a plurality of upwardly projecting retaining pieces 32b are provided. And, as the heater cover 32 is disposed in opposition to the top plate portion 31a of the heat shield plate 31 and downwardly of this top plate portion 31a and then these retaining pieces 32b are inserted into holes 31e defined in the top face portion 31a of the heat shield plate 31 and bent, the heater cover 32 is retained to the heat shield plate 31. With this, vertically between the heat shield plate 31 and the heater cover 32, there is formed a space S2 for accommodating the upper electrothermal heater 9 to be described later (see FIG. 6).

Here, as the heater cover 32 is formed of aluminum and the heat shield plate 31 is formed of Galvalume, the thermal conductivity of the heater cover 32 is set higher than the thermal conductivity of the heat shield plate 31. Further, the opening 30b of the outer cover 30A, the opening 30c of the inner cover 30B, the opening 30e of the frame member 30C, the opening 30c of the heat shield plate 31 and the opening 32a of the heater cover 32 are provided as openings formed at positions respectively corresponding to the opening of the check window B.

As shown in FIGS. 5 through 7, the upper electrothermal heater 9 is constructed as an elongate sheath heater which is bent to extend around substantially entire perimeter of the outer periphery of the heat resistant glass plate 10 as seen in the plane view and this heater 9 is disposed within the space S2 formed between the heat shield plate 31 and the heater cover 32. In this, the upper electrothermal heater 9 is placed in contact with the upper face of the heater cover 32 and fixed by affixing an aluminum foil 9a to the heater cover 32 from the upper side of the upper electrothermal heater 9. Further, this upper electrothermal heater 9 is disposed in close vicinity of the heat shield plate 31, but not in contact therewith. Further, the positions of a base end 9b and a terminal end 9c of the upper electrothermal heater 9 are set at positions on the rear side of the lid body 3 and offset to the opposite side (the upper side in FIG. 7) away from the control section accommodating chamber 6 inside the heating chamber 5.

Next, the assembled condition of the lid body 3 will be described.

As shown in FIG. 5, the outer lid 30 is fixed with its inner cover 30B being attached to its outer cover 30A from under and fixed by a fixing means (not shown) and is formed integral as its frame member 30C being attached from under through the opening 30e of the inner cover 30B. In this, the opening 30b of the outer cover 30A and the opening 30e of the frame member 30C are formed as openings of substantially same shape (see FIG. 6).

On the other hand, as shown in FIG. 5, fixation between the heater cover 32 and the upper electrothermal heater 9 is done by affixing of the aluminum foil 9a to the upper face of the heater cover 32 from the upper side of the upper electrothermal heater 9 with the upper electrothermal heater 9 being placed in contact with the upper face of the heater cover 32. And, the heater cover 32 is attached to the heat shield plate 31 from under with the respective retaining pieces 32b being inserted into and bent over the respective holes 31e of the heat shield plate 31. And, as the respective retaining pieces 32b are bent over, the heater cover 32, the upper electrothermal heater 9 and the heat shield plate 31 are fixed to each other (see FIG. 6).

And, the heat shield plate 31 is attached to the outer lid 30 from under, with the heat resistant glass plate 10 being engaged from under with the engaging portion 30f of the frame member 30C of the outer lid 30. In this, the contact supporting portion 31d of the heat shield plate 31 contacts and supports the outer peripheral edge portion 10a of the heat resistant glass plate 10 in such a manner as to surround it from under along the entire perimeter thereof. Thereafter, when the heat shield plate 31 and the outer cover 30 are fixed with the fixing means (not shown), the assembly of the lid body 3 is completed.

Therefore, the fixing arrangement for fixing the heat resistant glass plate 10 to the lid body 3 can be a very simple arrangement which requires only engaging the heat resistant glass plate 10 with the engaging portion 30f formed in the frame member 30C from under and then contacting and supporting the outer peripheral edge portion 10a of this engaged heat resistant glass plate 10 by the contact supporting portion 31d of the heat shield plate 31 from under. Further, the heat resistant glass plate 10 is fixed as being clamped between the engaging portion 30f of the frame member 30C and the contact supporting portion 31d of the heat shield plate 31 and moreover the outer peripheral edge portion 10a of the heat resistant glass plate 10 is contacted and supported by the contact supporting portion 31d of the heat shield plate 31 as being surrounded along the substantially entire perimeter thereof from under by the contact supporting portion 31d. So, reliable fixing of the heat resistant glass plate 10 is realized.

Further, as the outer peripheral edge 10a of the heat resistant glass plate 10 engaged with the engaging portion 30f is contacted and supported as being surrounded from under by the contact supporting portion 31d of the heat shield plate 31 formed of metal, heat of the upper electrothermal heater 9 can be transferred to air present downwardly of the heat resistant glass plate 10 inside the heating chamber 5, through the heat shield plate 31 which partitions/forms the upper portion inside the heating chamber 5, in particular, the substantially entire perimeter of the contact supporting portion 31d of the heat shield plate 31, so that heating can be done efficiently. In addition, the heat of the upper electrothermal heater 9 can be transferred directly to the substantially entire perimeter of the outer peripheral edge portion 10a of the heat resistant glass plate 10 through the substantially entire perimeter of the contact supporting portion 31d of the heat shield plate 31 which contacts and supports the heat resistant glass plate 10, so that this heat resistant glass plate 10 per se can be heated effectively. Therefore, with utilization of the heat shield plate 31 having the function of fixing the heat resistant glass plate 10, with the heat transfer from the upper electrothermal heater 9, heating of the air present downwardly of the heat resistant glass plate 10 inside the heating chamber 5 and heating of the heat resistant glass plate 10 per se can be effected simultaneously. Hence, the temperatures of this air and the heat resistant glass plate 10 can be raised reliably and easily. For this reason, even if steam is generated form the bread dough inside the heating chamber 5, clouding due to dew condensation on the heat resistant glass plate 10 can be prevented in a reliable manner.

Further, since the upper electrothermal heater 9 disposed in the vicinity of the heat shield plate 31 is provided in the bent form to surround the heat resistant glass plate 10 as seen in the plane view, the heat from the upper electrothermal heater 9 can be transferred easily and reliably along the substantially entire perimeter of the contact supporting portion 31d of the heat shield plate 31 surrounding the heat resistant glass plate 10. Moreover, the heat is transferred easily and reliably via this contact supporting portion 31d to the outer peripheral edge portion 10a of the heat resistant glass plate 10 along the substantially entire perimeter thereof. Accordingly, with the heat of the upper electrothermal heater 9, the temperature of the air present downwardly of the heat resistant glass plate 10 and the temperature of the heat resistant glass plate 10 per se can be raised along the substantially entire perimeter of the heat resistant glass plate 10 with less unevenness. Hence, the clouding due to dew condensation can be prevented even more reliably.

In addition, since the heat shield plate 31 partitioning/forming the upper portion inside the heating chamber 5 includes the top face portion 31a and the lateral face portions 31b, the construction of the heat shield plate 31 can be simple for achieving cost reduction while securing as large as possible space in the upper portion inside the heating chamber 5. Also, the top face portion 31a of the heat shield plate 31 includes the bulging portion 31p which bulges upwards and the upper end portion of this bulging portion 31p constitutes the contact supporting portion 31d which contacts and supports from under the outer peripheral edge portion 10a of the heat resistant glass plate 10 engaged with the engaging portion 30f while surrounding it from under. Hence, in the course of rising movement of the air heated to a relatively high temperature by the lower electrothermal heater 8 or the upper electrothermal heater 9, this air is guided along the lateral face portions 31b and the top face portion 31a of the heat shield plate 31 at the upper portion inside the heating chamber 5 into the space S1 inside the bulging portion 31 formed in this top face portion 31a. Therefore, with this air having the relatively high temperature guided into this space S1, air present downwardly of the heat resistant glass plate 10 and this heat resistant glass plate 10 per se can be heated to a higher temperature in a reliable manner. As a result, clouding due to dew condensation can be prevented even more reliably. Moreover, since the upper end portion of the bulging portion 31p constitutes the contact supporting portion 31d which contacts and supports the outer peripheral edge portion 10a of the heat resistant glass plate 10, this contact supporting portion 31d is heated with the air of the relatively high temperature guided to this space S1, so that through this contact supporting portion 31d, the outer peripheral edge portion 10a of the heat resistant glass plate 10 can be heated even more effectively.

And, the heat transferred downward from the upper electrothermal heater 9 is transferred mainly through the heater cover 32 placed in contact with the upper electrothermal heater 9 to the upper portion of the bread dough located downwardly. On the other hand, the heat transferred upward from the upper electrothermal heater 9 is mainly blocked by the heat shield plate 31 and reflected toward the heater cover 32 (lower side) disposed downwardly of and in opposition to the heat shield plate 31 and then this heat is transferred through this heater cover 32 to the upper portion of the bread dough disposed downwardly. Therefore, the heat from the upper electrothermal heater 9 can be transferred to the upper portion of the bread dough in a more efficient manner, so that saving of power consumption can be achieved. Moreover, since the thermal conductivity of the heater cover 32 is set higher than the thermal conductivity of the heat shield plate 31, it is possible to increase the amount of heat from the upper electrothermal heater 9 to the heater cover 32 side, so that the bread dough can be heated even more efficiently and possible also to decrease the amount of heat transfer to the heat shield plate 31 side, so that deterioration and/or deformation of the resin or the like forming the outer lid 30 of the lid body 3.

Next, operations of the control section 15, etc. when the bread material is baked into bread by the bread maker will be explained briefly.

An operator will open the lid body 3 and charge an amount of bread material (bread dough) into the bread case 2. Then, the operator will close the lid body 3 and operate the operational section 17 for commanding start of operation. In response to this, the control section 15 controls the lower electrothermal heater 8, the upper electrothermal heater 9, the electric motor 21, etc. with respective preset conditions, thereby to execute a kneading process for kneading the bread dough, a fermenting process for fermenting the bread dough and a baking process for heating the bread dough to bake bread, one after another, so that bread will be baked.

In the above, in the kneading process and the fermenting process, the temperature inside the heating chamber 5 is relatively low (e.g. about 40° C.). Hence, if steam is generated from the bread dough, this will result in dew condensation on the heat resistant glass plate 10 disposed at the upper portion inside the heating chamber 5, thus tending to invite clouding thereof. Moreover, since the bread dough in the kneading process and the fermenting process contains a sufficient amount of water therein, so steam can easily be generated therefrom. In such case too, since the control section 15 provides power to the upper electrothermal heater 9 for heat generation in the kneading process and the fermenting process, heating of the air present downwardly of the heat resistant glass plate 10 and heating of this heat resistant glass plate 10 per se inside the heating chamber 5 are effected simultaneously by the heat transferred from the upper electrothermal heater 9, so that the temperature of the air and the temperature of the heat resistant glass plate 10 can be raised reliably and easily. Therefore, in baking bread, even in the kneading process and the fermenting process wherein the temperature inside the heating chamber 5 is relatively low, thus tending to invite dew condensation on the heat resistant glass plate 10, clouding due to dew condensation can be avoided reliably.

Accordingly, in the kneading process and the fermenting process, it is possible to constantly monitor the condition of the bread dough inside the bread case 2 in the heating chamber 5, with good visibility from the outside through the heat resistant glass plate 10 of the check window B. Incidentally, the control section 15 may be alternatively configured to execute the control for causing the upper electrothermal heater 9 in either one of the kneading process and the fermenting process.

Further, since the control section 15 provides power to the upper electrothermal heater 9 for heat generation in the baking process too, when needed, it is possible to heat the upper portion of the bread dough with the heat transfer from the upper electrothermal heater 9, so that a toasting color may be provided thereto in a reliable manner. Incidentally, during a baking process when the temperature of the inside of the heating chamber 5 is relatively high, clouding of the heat resistant glass plate 10 rarely occurs. However, in such case too, by causing the upper electrothermal heater 9 to generate heat, the clouding of the heat resistant glass plate 10 can be prevented even more reliably.

[Other Embodiments]

(A) In the foregoing embodiment, as shown in FIG. 7, the upper electrothermal heater 9 is disposed so as to circumscribe the substantially entire perimeter of the outer periphery of the heat resistant glass plate 10 as seen in the plane view and the base end 9b and the terminal end 9c of the upper electrothermal heater 9 are disposed on the rear side of the lid body 3 on the opposite side away from the control section accommodating chamber 6. Instead of this, any other arrangement may be employed as long as such other arrangement too can ensure good heat transfer of the heat from the upper electrothermal heater 9 to the upper portion of the bread dough inside the bread case 2.

Figure 8:
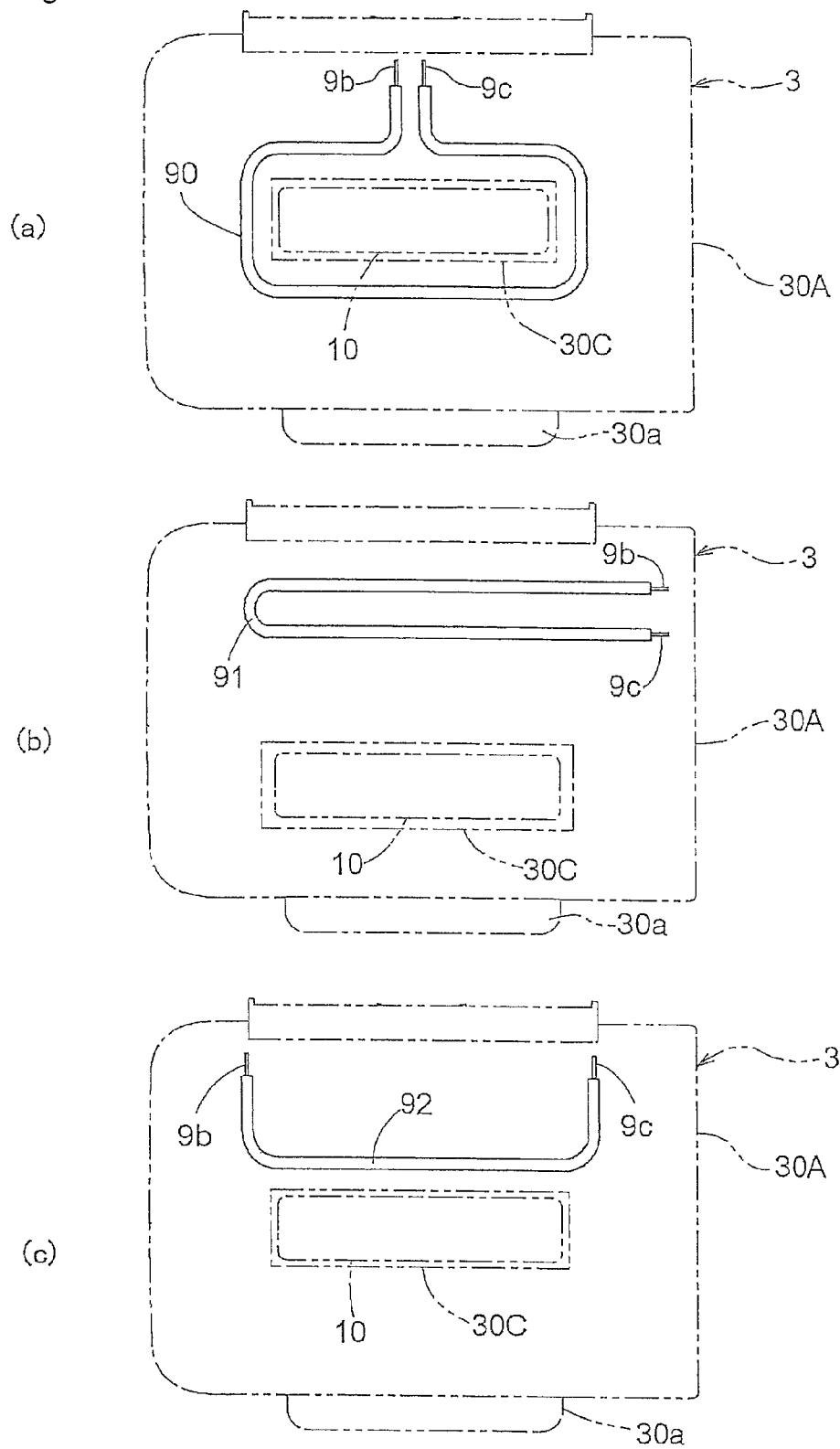
FIG. 8 is a bottom view showing a lid body relating to a further embodiment.

For instance, in an arrangement shown in FIG. 8 (a), as seen in the plane view, an upper electrothermal heater 90 is disposed to surround the periphery of the heat resistant glass plate 10 and the base end 9b and the terminal end 9c of the upper electrothermal heater 90 are disposed on the rear side of the lid body 3 (the upper side in FIG. 8 (a)) and in the vicinity of a longitudinal intermediate position inside the heating chamber 5.

In a further arrangement shown in FIG. 8 (b), as seen in the plane view, the base end 9b and the terminal end 9c of the upper electrothermal heater 91 are disposed on the rear side of the lid body 3 (the upper side in FIG. 8 (b)) and on the side of the control section accommodating chamber 6 (the right side in FIG. 8 (b)), and the electrothermal heater 91 is disposed on the rear side of the lid body 3 (the upper side in FIG. 8 (b)) to extend in alternation along the longitudinal direction of the heat resistant glass plate 10.

In a still further arrangement shown in FIG. 8 (c) as seen in the plane view, the base end 9b and the terminal end 9c of the upper electrothermal heater 92 are disposed on the rear side of the lid body 3 (the upper side in FIG. 8 (c)) and in distribution on the opposed sides of the longitudinal direction of the heat resistant glass plate 10. And, the upper electrothermal heater 92 is disposed along the longitudinal direction of the heat resistant glass plate 10 on the rear side (the upper side in FIG. 8 (c)) of the heat resistant glass plate 10.

Further alternatively, though not shown, the upper electrothermal heater 9 may be provided in the form of an approximately annular curved shape as seen in the plane view.

(B) In the foregoing embodiment, the heat resistant glass plate 10 as a plate-like transmission body constituting the check window B was formed rectangular. However, the invention is not particularly limited thereto. Any other appropriate shape can be used also as long as such other shape too ensures visibility of the inside of the heating chamber 5, such as a circular shape, a square shape, a polygonal shape, etc.

(C) In the foregoing embodiment, as the plate-like transmission body constituting the check window B, the heat resistant glass plate 10 was employed. However, the invention is not particularly limited thereto. Any other arrangement ensuring the visibility of the inside of the heating chamber 5 can be employed. For instance, a transparent heat-resistant resin or the like may be employed.

(D) In the foregoing embodiment, there was described the arrangement wherein for mounting the upper electrothermal heater 9 to the lid body 3 in the vicinity of the heat shield plate 31 as an inner lid, the heater cover 32 is attached to the heat shield plate 31 and the upper electrothermal heater 9 is placed in contact with the heater cover 32. The present invention is not particularly limited thereto. For instance, the upper electrothermal heater 9 may be disposed with a spacing relative to the heater cover 32 or disposed in contact with the heat shield plate 31. Further, the heater cover 32 may be omitted and the upper electrothermal heater 9 may be disposed in the vicinity of the heat shield plate 31 with a spacing relative to this heat shield plate 31.

(E) In the foregoing embodiment, the thermal conductivity of the heater cover 32 was set higher than the thermal conductivity of the heat shield plate 31. Instead, these may be set equal to each other. Or, depending on the situation, the thermal conductivity of the heater cover 32 may be set lower than the thermal conductivity of the heat shield plate 31 as the inner lid.

In this case, like the foregoing embodiment, the material of the heater cover 32 is not limited to aluminum and the material of the heat shield plate 31 is not limited to Galvalume. Instead, these components may be formed of any other various kinds of metal such as Alstar, etc.

(F) In the foregoing embodiment, there was described a bread maker. However, the electrothermal heating cooker is not limited to a bread maker. The invention may be applied also to e.g. an electrothermal hot plate, an electric rice cooker, an electric rice cooker having a bread baking function, etc.

In this case, as the heating case, various types may be employed depending on the specific type of the electrothermal heating cooker such as a heating case having a high raised outer peripheral portion or a low raised outer peripheral portion or having a rectangular shape or a circular shape as viewed in the plane view. For example, for a bread maker or a rice cooker, a heating case (bread case 2 or a cooking rice kettle) having a high raised outer peripheral portion will be employed. And, for a hot plate, a heating case having a low raised outer peripheral portion will be employed.

(G) In the foregoing embodiment, when the bread case 2 is attached inside the casing C, the upper opening of the bread case 2 is located downwardly of the upper opening 4 of the casing C. However, a further arrangement is also possible wherein the upper opening of the bread case 2 is located on the same level as or upwardly of the upper opening 4 of the casing C. In this case, the upper opening of the bread case 2 is to be located at the portion partitioned and formed by the lid body 3 in the upper portion inside the heating chamber 5.

(H) In the foregoing embodiment, in the arrangement of the contact supporting portion 31d of the heat shield plate 31 contacting/supporting from under the outer peripheral edge portion 10a of the heat resistant glass plate 10 engaged with the engaging portion 30f of the frame member 30C with the former surrounding the latter from under, the contact supporting portion 31d surrounds the outer peripheral edge portion 10a along the entire perimeter thereof. Instead, a different arrangement is also possible e.g. wherein the contact supporting portion 31d surrounds the outer peripheral edge portion 10a from under and contacts and supports it along at least a portion of its entire perimeter (e.g. at 6 portions or more spaced equidistantly along the outer peripheral edge portion 10a).

(I) In the foregoing embodiment, the outer lid 30 includes the outer cover 30A, the inner cover 30B and the frame member 30C. However, the invention is not limited thereto. Instead, some or all of these components may be formed integral.

(J) In the foregoing embodiment, the lid body 3 has an approximately inverse U-shape bulging upward in the vertically sectional side view and vertically sectional front view and the inner space of the lid body 3 and the inner space of the casing C form the heating chamber 5. Instead, the heating chamber 5 may be formed in the inner space of the casing C alone. According to an example of such alternative arrangement, the heat shield plate 31 (inner lid) and the heater cover 32 of the lid body 3 are disposed in the lower face of the lid body 3 to be parallel with the opening face of the upper opening 4 of the casing C in the vertically sectional side view and vertically sectional front view and only the inner space of the casing C partitioned/formed by the casing C and the heat shield plate 31 (inner lid) and the heater cover 32 of the lid body 3 is formed as the heating chamber 5.

As described above, it is possible to provide an electrothermal heating cooker capable of heating an upper portion of a heating object reliably and preventing clouding of the check window with a simple arrangement through appropriate arrangement of an upper electrothermal heater and the check window.

What is claimed is:

1. An electrothermal heating cooker comprising:
 a casing having an upper opening and accommodating a heating case for a heating object;
 a lid body for covering and closing the upper opening of the casing;
 a lower electrothermal heater for heating a lower portion inside a heating chamber formed by the casing and the lid body;
 an upper electrothermal heater for heating an upper portion inside the heating chamber; and
 a check window comprised of a plate-like transmission body allowing transmission of at least visible light therethrough;
 wherein said lid body includes an outer lid and an inner lid made of metal, the inner lid being disposed downwardly of the outer lid and partitioning and forming the upper portion inside the heating chamber;
 said upper electrothermal heater is mounted to said lid body adjacent said inner lid;
 said outer lid and said inner lid respectively define an opening corresponding to said check window;
 wherein a lower side of an opening edge portion of said outer lid forms an engaging portion for engaging from under said plate-like transmission body constituting said check window, and an upper side of an opening edge portion of said inner lid forms a contact supporting portion for contacting and supporting an outer peripheral edge portion of said plate-like transmission body engaged with said engaging portion while surrounding this outer peripheral edge portion from under; and
 wherein said upper electrothermal heater has a bent or curved shape and is disposed in such a manner to surround said plate-like transmission body as seen in a plane view.

2. An electrothermal heating cooker according to claim 1, wherein said inner lid includes a top face portion which partitions and forms a top face inside the heating chamber and a lateral face portion which partitions and forms a lateral face inside the heating chamber, and said top face portion includes a bulging portion which bulges upward and an upper end portion of said bulging portion as an upper side of the opening edge portion of the inner lid constitutes said contact supporting portion.

3. An electrothermal heating cooker comprising:
 a casing having an upper opening and accommodating a heating case for a heating object;
 a lid body for covering and closing the upper opening of the casing;
 a lower electrothermal heater for heating a lower portion inside a heating chamber formed by the casing and the lid body;
 an upper electrothermal heater for heating an upper portion inside the heating chamber; and
 a check window comprised of a plate-like transmission body allowing transmission of at least visible light therethrough;
 wherein said lid body includes an outer lid and an inner lid made of metal, the inner lid being disposed downwardly of the outer lid and partitioning and forming the upper portion inside the heating chamber;
 said upper electrothermal heater is mounted to said lid body adjacent said inner lid;
 said outer lid and said inner lid respectively define an opening corresponding to said check window;
 wherein a lower side of an opening edge portion of said outer lid forms an engaging portion for engaging from under said plate-like transmission body constituting said check window, and an upper side of an opening edge portion of said inner lid forms a contact supporting portion for contacting and supporting an outer peripheral edge portion of said plate-like transmission body engaged with said engaging portion while surrounding this outer peripheral edge portion from under; and
 wherein a heater cover made of metal is disposed in opposition to and downwardly of a heat shield plate as said inner lid, and said upper electrothermal heater is disposed in a space formed between said heat shield plate and said heater cover and in contact with said heater cover.

4. An electrothermal heating cooker according to claim 3, wherein said heater cover has a thermal conductivity which is set equal to or higher than the thermal conductivity of said heat shield plate.

5. An electrothermal heating cooker comprising:
 a casing having an upper opening and accommodating a heating case for a heating object;
 a lid body for covering and closing the upper opening of the casing;
 a lower electrothermal heater for heating a lower portion inside a heating chamber formed by the casing and the lid body;
 an upper electrothermal heater for heating an upper portion inside the heating chamber; and
 a check window comprised of a plate-like transmission body allowing transmission of at least visible light therethrough;
 wherein said lid body includes an outer lid and an inner lid made of metal, the inner lid being disposed downwardly of the outer lid and partitioning and forming the upper portion inside the heating chamber;
 said upper electrothermal heater is mounted to said lid body adjacent said inner lid;
 said outer lid and said inner lid respectively define an opening corresponding to said check window;
 wherein a lower side of an opening edge portion of said outer lid forms an engaging portion for engaging from under said plate-like transmission body constituting said check window, and an upper side of an opening edge portion of said inner lid forms a contact supporting portion for contacting and supporting an outer peripheral edge portion of said plate-like transmission body engaged with said engaging portion while surrounding this outer peripheral edge portion from under;

wherein the electrothermal heating cooker further comprises a control section for controlling operation of said upper electrothermal heater; and wherein said control section causes said upper electrothermal heater to generate heat in at least one of a kneading process and a fermenting process for bread dough which process is effected prior to a baking process for baking bread dough as said heating object placed inside said heating case.

6. An electrothermal heating cooker according to claim 1, wherein the electrothermal heating cooker further comprises a control section for controlling the operation of the upper electrothermal heater, said control section causing said upper electrothermal heater to generate heat during a baking process for baking bread dough as the heating object inside the heating case.

7. An electrothermal heating cooker according to claim 3, wherein the electrothermal heating cooker further comprises a control section for controlling the operation of the upper electrothermal heater, said control section causing said upper electrothermal heater to generate heat during a baking process for baking bread dough as the heating object inside the heating case.

8. An electrothermal heating cooker according to claim 5, wherein the electrothermal heating cooker further comprises a control section for controlling the operation of the upper electrothermal heater, said control section causing said upper electrothermal heater to generate heat during a baking process for baking bread dough as the heating object inside the heating case.

* * * * *